(12) United States Patent  (10) Patent No.: US 7,736,807 B2
Hasegawa et al.  (45) Date of Patent: Jun. 15, 2010

(54) NON-AQUEOUS ELECTROLYTIC SOLUTION SECONDARY BATTERY

(75) Inventors: Minoru Hasegawa, Fukushima (JP); Yuzuru Fukushima, Miyagi (JP); Guohua Li, Fukushima (JP); Takehiko Ishii, Fukushima (JP); Masaki Kuratsuka, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/184,861

(22) Filed: Aug. 1, 2008

(65) Prior Publication Data

US 2009/0053614 A1   Feb. 26, 2009

(30) Foreign Application Priority Data

Aug. 23, 2007 (JP) ............................. 2007-216831

(51) Int. Cl.
    *H01M 4/58* (2006.01)
(52) U.S. Cl. ............ 429/231.1; 429/231.3; 429/231.2; 429/221; 429/231.95; 429/199; 429/200; 429/218.1; 429/330; 429/338
(58) Field of Classification Search ............ 429/231.1, 429/231.3, 231.2, 221, 231.95, 199, 218.1, 429/200, 330, 338
    See application file for complete search history.

(56) References Cited

U.S. PATENT DOCUMENTS

| | | | |
|---|---|---|---|
| 6,506,524 B1 | 1/2003 | McMillan et al. | |
| 6,746,799 B2 | 6/2004 | Yamada et al. | |
| 6,749,967 B2 | 6/2004 | Li et al. | |
| 2007/0148541 A1* | 6/2007 | Wakita et al. | 429/330 |
| 2009/0053598 A1* | 2/2009 | Abe et al. | 429/199 |
| 2009/0061325 A1* | 3/2009 | Odani et al. | 429/330 |
| 2009/0061326 A1* | 3/2009 | Hirose et al. | 429/221 |
| 2009/0092892 A1* | 4/2009 | Yamaguchi et al. | 429/221 |

FOREIGN PATENT DOCUMENTS

| | | |
|---|---|---|
| JP | 62-290072 | 12/1987 |
| JP | 07-011967 | 2/1995 |
| JP | 08-287950 | 11/1996 |
| JP | 09-171827 | 6/1997 |
| JP | 2001-307730 | 11/2001 |
| JP | 2002-117833 | 4/2002 |
| JP | 2002-170567 | 6/2002 |
| JP | 2004-111242 | 4/2004 |
| JP | 2006-332020 | 12/2006 |
| JP | 2007-216831 | 8/2007 |
| JP | 2007-522620 | 8/2007 |

OTHER PUBLICATIONS

Japanese Office Action issued on Jul. 14, 2009, for corresponding Japanese Patent Application JP 2007-216831.

* cited by examiner

*Primary Examiner*—Laura S Weiner
(74) *Attorney, Agent, or Firm*—K&L Gates LLP

(57) ABSTRACT

A non-aqueous electrolytic solution secondary battery includes a positive electrode containing, as a positive electrode active material, a compound represented by the following general formula, $Li_xFe_{1-y}M_yPO_4$, wherein M is at least one member selected from the group consisting of Co, Ni, Cu, Zn, Al, Sn, B, Ga, Cr, V, Ti, Mg, Ca and Sr; $0.9<x<1.2$; and $0 \leq y<0.3$; a negative electrode containing a lithium metal, a lithium alloy or a material capable of doping and dedoping lithium; and a non-aqueous electrolytic solution, the non-aqueous electrolytic solution containing a fluorinated ethylene carbonate FEC.

3 Claims, 2 Drawing Sheets

NON-AQUEOUS ELECTROLYTIC SOLUTION SECONDARY BATTERY

CROSS REFERENCES TO RELATED APPLICATIONS

The present application claims priority to Japanese Patent Application JP 2007-216831 filed in the Japan Patent Office on Aug. 23, 2007, the entire contents of which is being incorporated herein by reference.

BACKGROUND

The present application provides a non-aqueous electrolytic solution secondary battery having an excellent life characteristic.

In recent years, the study of rechargeable secondary batteries is being advanced as a power source which can be used over a long period of time conveniently and economically with tremendous progress of a variety of electronic instruments. As representative secondary batteries, there are known a lead storage battery, an alkaline storage battery and a non-aqueous electrolytic solution secondary battery.

Of the foregoing secondary batteries, in particular, a lithium ion secondary battery which is a non-aqueous electrolytic solution secondary battery has advantages such as high output and high energy density. The lithium ion secondary battery is configured of at least a positive electrode and a negative electrode each having an active material capable of reversibly inserting and extracting a lithium ion and a non-aqueous electrolytic solution.

The lithium ion secondary battery is widely used for mobile instruments such as a notebook type personal computer, a mobile phone and a camcorder in view of characteristic features including light weight and high energy density. In lithium ion secondary batteries which are generally put into practical use at present, lithium/cobalt composite oxide $LiCoO_2$ having a stratified rock salt structure is used for a positive electrode active material. However, cobalt is poor in natural resources and expensive, and therefore, a positive electrode active material which can be a replacement thereof is groped. Of these, the development of a positive electrode material on a basis of manganese Mn which is rich in natural resources and cheap is desired as a replacement of Co. There is proposed lithium/manganese composite oxide $LiMn_2O_4$ having a spinel structure and having a space group Fd3m as the positive electrode material on a basis of Mn. This $LiMn_2O_4$ has a high potential as 4 V class vs. lithium potential, the value of which is equal to $LiCoO_2$. Furthermore, $LiMn_2O_4$ is a very promising material in view of the matters that it is easily synthesized and has a high battery capacity and is already put into practical use.

However, in fact, the lithium ion secondary battery configured of $LiMn_2O_4$ as a positive electrode active material involves a problem that Mn is dissolved in an electrolytic solution during the cycle to cause cycle deterioration and a problem that the stability is insufficient in view of characteristics.

Now, a variety of studies regarding a material based of iron Fe as the positive electrode material have been made. Fe is a material which is richer in natural resources and cheaper than Mn, and if a positive electrode material on a basis of Fe can be realized, such is more favorable. As the positive electrode material on a basis of Fe, studies are made centering on, for example, a material composed of, as a basic composition, $LiFeO_2$ which has a structure similar to $LiCoO_2$ or $LiNiO_2$. However, $LiFeO_2$ is difficult in preparation and instable in structure, and its sufficient characteristics as a positive electrode active material for lithium ion secondary battery have not been realized yet.

On the other hand, there is proposed the use of lithium iron phosphate $LiFePO_4$ as a positive electrode material of lithium ion secondary battery, see, for example, JP-A-9-171827. $LiFePO_4$ has a large volume density as 3.6 g/cm$^3$, generates a high potential of 3.4 V and has a large theoretical capacity as 170 mAh/g. Moreover, since $LiFePO_4$ contains one Li capable of being electrochemically dedoped in the initial state per Fe atom, it may be said that $LiFePO_4$ is a promising material as the positive electrode active material of lithium ion secondary battery.

SUMMARY

However, in batteries using $LiFePO_4$ as the positive electrode active material, detailed studies regarding an electrolytic solution have not been made, and a basic electrolyte such as $LiPF_6$, which is used in existing lithium ion secondary batteries, is used.

However, $LiPF_6$ is poor in heat stability, is readily hydrolyzable upon reaction with even a trace amount of water and has properties that it is especially instable during a rise of the battery temperature at discharge at the time of cycle. Thus, when $LiPF_6$ is hydrolyzed, hydrogen fluoride, phosphoric acid, etc. is generated. When $LiPF_6$ is used, there is caused a problem that the capacity of the positive electrode or negative electrode is lowered due to hydrogen fluoride, phosphoric acid, etc. generated by the hydrolysis. This problem is noticeable especially in the cycle and becomes a serious problem.

Also, in the case where the foregoing $LiFePO_4$ is used as the positive electrode active material, it is necessary to very finely divide particles and use them for the purpose of gaining the capacity, and the number of particles of the positive electrode active material becomes large. Also, since such a material is low in conductivity, it is necessary to use a large amount of a conductive agent for compensating the low conductivity. For that reason, the number of particles of the material to be used for the positive electrode is large as compared with that in the case of using a positive electrode active material other than $LiFePO_4$ having an olivine type crystal structure. Then, since water is deposited on the respective particles, the amount of water to be contained in the battery becomes large due to water deposited on these particles as compared with the case of using a positive electrode active material other than those having an olivine type crystal structure. In consequence, in the case of using a compound having an olivine type crystal structure as a positive electrode active material and using $LiPF_6$ as an electrolyte salt, the foregoing lowering of the cycle becomes noticeable.

Under such circumstances, it is desirable to provide a non-aqueous electrolytic solution secondary battery having an excellent life characteristic.

According to an embodiment, there is provided a non-aqueous electrolytic solution secondary battery including a positive electrode containing, as a positive electrode active material, a compound represented by the following general formula, $Li_xFe_{1-y}M_yPO4$, wherein M is at least one member selected from the group consisting of Co, Ni, Cu, Zn, Al, Sn, B, Ga, Cr, V, Ti, Mg, Ca and Sr; 0.9<x<1.2; and 0≦y<0.3; a negative electrode containing a lithium metal, a lithium alloy or a material capable of doping and dedoping lithium; and a non-aqueous electrolytic solution, the non-aqueous electrolytic solution containing a fluorinated ethylene carbonate FEC.

The thus configured non-aqueous electrolytic solution secondary battery according to an embodiment contains, as a positive electrode active material, a compound having an olivine type crystal structure and represented by the general formula, $Li_xFe_{1-y}M_yPO_4$. By using, as a positive electrode active material, a material on a basis of iron which is richer in natural resources and cheaper than manganese, a cheap non-aqueous electrolytic solution secondary battery can be realized according to the embodiment.

Also, for example, when $LiFePO_4$ is taken as an example, such a material has a large volume density as 3.6 g/cm$^3$, generates a high potential as 3.4 V and has a large theoretical capacity as 170 mAh/g. Moreover, since $LiFePO_4$ contains one Li capable of being electrochemically dedoped in the initial state per Fe atom, $LiFePO_4$ is a promising material as a positive electrode active material of lithium ion secondary battery. In consequence, a non-aqueous electrolytic solution secondary battery having a high capacity can be realized according to the embodiment.

Then, in an embodiment, the non-aqueous electrolytic solution is characterized by containing an FEC as an additive. The FEC is reductively decomposed at a nobler potential than water during the initial charge and reacts with water in the electrode during that. According to this, water in the interior of the battery is subsequently not reduced so that hydrogen fluoride or phosphoric acid which lowers the battery life is not formed. For that reason, by using, as a positive electrode active material, a compound having an olivine type crystal structure and represented by the general formula, $Li_xFe_{1-y}M_yPO_4$, even in the case where the amount of water to be contained in the battery is relatively large, hydrogen fluoride, phosphoric acid, etc. is not generated. That is, there is no problem of a lowering of the life to be caused due to a lithium salt as in the case of using $LiPF_6$ for the electrolyte.

In consequence, in the non-aqueous electrolytic solution secondary battery according to the embodiment, by containing an FEC as an additive to be contained in the non-aqueous electrolytic solution, it is possible to reduce the water content value of the electrode and to reduce and prevent the generation of hydrogen fluoride or phosphoric acid. Therefore, it is possible to reduce and prevent a lowering of the capacity of the positive electrode or negative electrode to be caused due to hydrogen fluoride or phosphoric acid. That is, according to this, in the embodiment according to the present application, it is possible to prevent a lowering of the life, and a non-aqueous electrolytic solution secondary battery having an excellent life characteristic can be realized.

Additional features and advantages are described herein, and will be apparent from the following Detailed Description and the figures.

DETAILED DESCRIPTION

Embodiments are described below with reference to the accompanying drawings.

Figure 1:
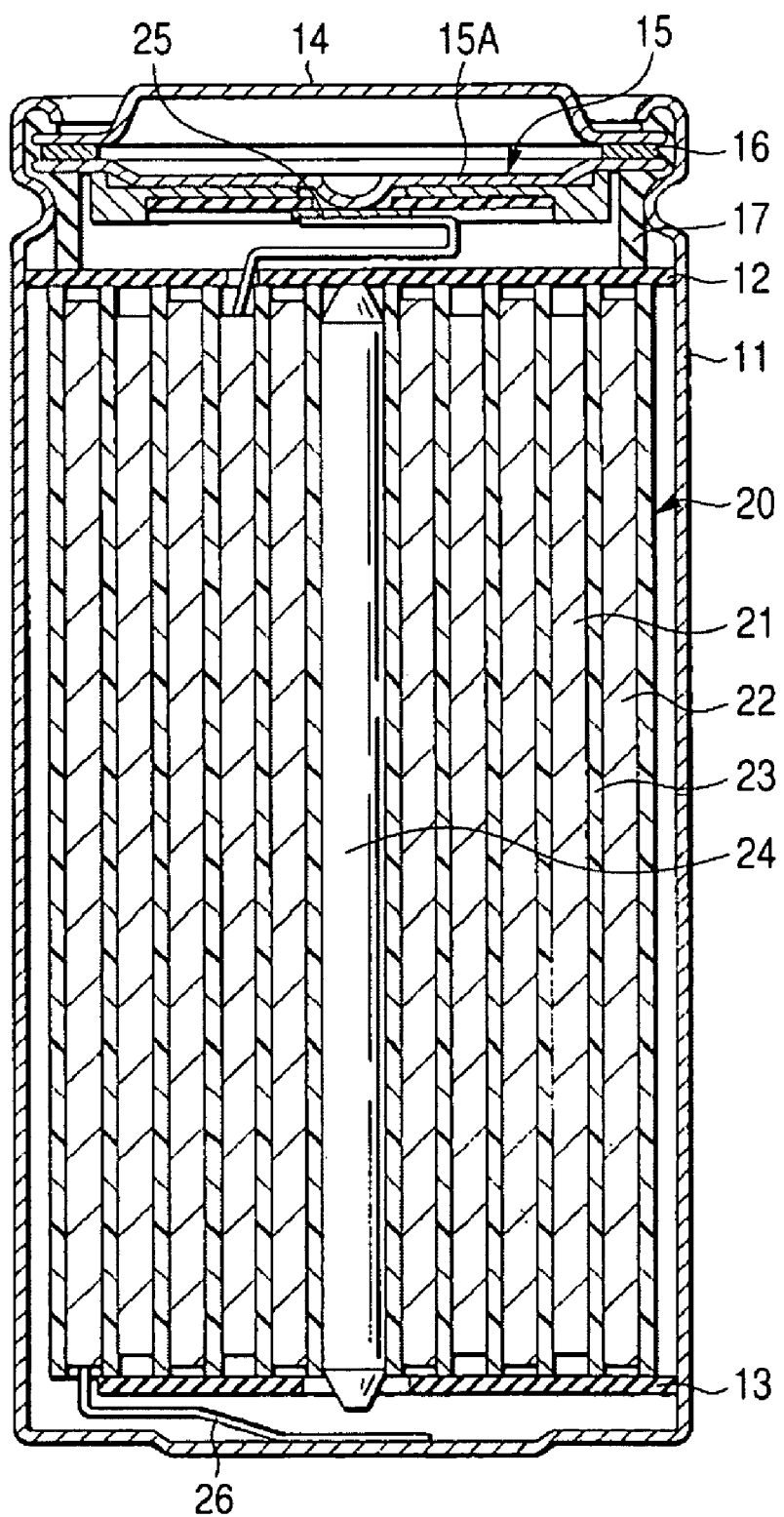
FIG. 1 is a cross-sectional view illustrating a configuration of a secondary battery according to an embodiment.

FIG. 1 illustrates a cross-sectional structure of a secondary battery according to an embodiment. This secondary battery is one which is of a so-called cylinder type and has a wound electrode body 20 in which a pair of a strip-shaped positive electrode 21 and a strip-shaped negative electrode 22 are wound via a separator 23 in the interior of a substantially hollow columnar battery can 11. The battery can 11 is configured of, for example, nickel-plated iron, in which one end thereof is closed, with the other end being opened. Inside the battery can 11, a pair of insulating plates 12 and 13 are vertically disposed, respectively against the winding peripheral surface so as to interpose the wound electrode body 20 therebetween.

A battery lid 14, a safety valve mechanism 15 provided in the inside of this battery lid 14 and a positive temperature coefficient PTC element 16 are caulked via a gasket 17 and installed in the opened end of the battery can 11, and the interior of the battery can 11 is sealed. The battery lid 14 is configured of, for example, a material the same as in the battery can 11. The safety valve mechanism 15 configures a current breaking sealing body together with the positive temperature coefficient element 16. The safety valve mechanism 15 is electrically connected to the battery lid 14 via the positive temperature coefficient element 16, and when the internal pressure of the battery reaches a fixed value or greater due to an internal short circuit or heating from the exterior or the like, a disc plate 15A, electric power lead-through plate is reversed, thereby cutting the electric connection between the battery lid 14 and the wound electrode body 20. The positive temperature coefficient element 16 is one which when the temperature rises, controls the current due to an increase of the resistivity value, thereby preventing abnormal heat generation to be caused due to a large current from occurring. The gasket 17 is configured of, for example, an insulating material, on the surface of which is coated asphalt.

For example, a center pin 24 is inserted in the center of the wound electrode body 20. A positive electrode lead 25 made of aluminum or the like is connected to the positive electrode 21 of the wound electrode body 20, and a negative electrode lead 26 made of nickel or the like is connected to the negative electrode 22. The positive electrode lead 25 is electrically connected to the battery lid 14 upon being welded on the safety valve mechanism 15, and the negative electrode lead 26 is welded on and electrically connected to the battery can 11.

<Positive Electrode>

Figure 2:
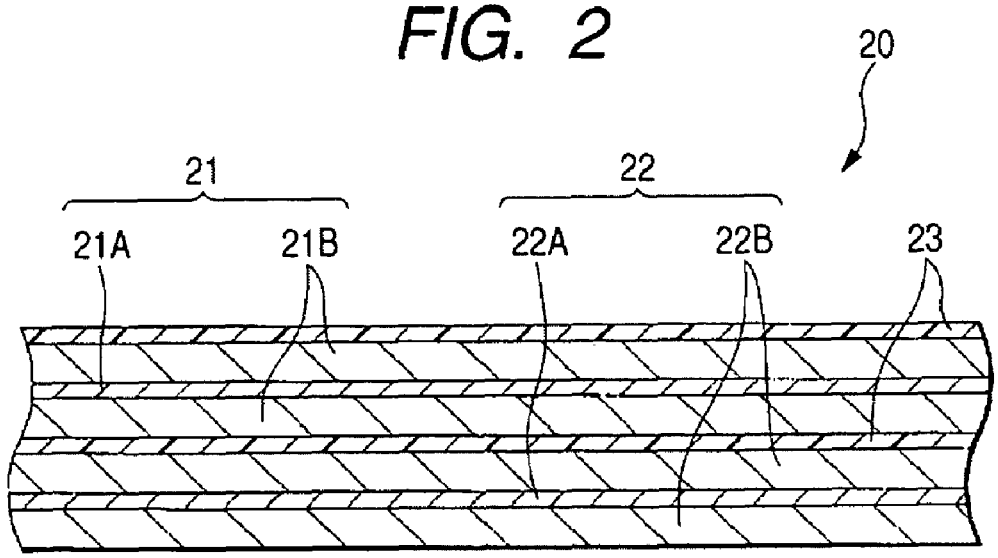
FIG. 2 is a cross-sectional view enlarging and illustrating a part of a wound electrode body in the secondary battery as illustrated in FIG. 1.

FIG. 2 is a view enlarging and illustrating a part of the wound electrode body 20 as illustrated in FIG. 1. As illustrated in FIG. 2, for example, the positive electrode 21 has a structure in which a positive electrode active material layer 21B is provided on the both surfaces of a positive electrode collector 21A having a pair of opposing surfaces. While illustration is omitted, the positive electrode active material layer 21B may be provided on only one surface of the positive electrode collector 21A. The positive electrode collector 21A is configured of, for example, a metallic foil such as an aluminum foil.

The positive electrode active material layer 21B uses, as the positive electrode active material, a compound having an olivine type crystal structure and represented by the following general formula, $Li_xFe_{1-y}M_yPO_4$ wherein M is at least one member selected from the group consisting of Co, Ni, Cu, Zn, Al, Sn, B, Ga, Cr, V, Ti, Mg, Ca and Sr; $0.9 < x < 1.2$; and $0 \leq y < 0.3$, this compound hereinafter being described as "lithium iron phosphate". As such a lithium iron phosphate, for example, $LiFePO_4$ is favorable.

Since such a lithium iron phosphate is a material on a basis of iron which is richer in natural resources and cheaper than manganese, a cheap non-aqueous electrolytic solution secondary battery can be realized as compared with the case of using a lithium/manganese composite oxide based material as the positive electrode active material.

Also, for example, when $LiFePO_4$ is taken as an example, such a lithium iron phosphate material has a large volume density as 3.6 g/cm$^3$, generates a high potential as 3.4 V and has a large theoretical capacity as 170 mAh/g, and therefore, it is possible to realize a non-aqueous electrolytic solution secondary battery having a high capacity. Furthermore, since $LiFePO_4$ contains one Li capable of being electrochemically dedoped per Fe atom in the initial state, $LiFePO_4$ is excellent in view of energy density and is a very favorable material as the positive electrode active material of the lithium ion secondary battery. In the positive electrode 21, these positive electrode active materials may be used singly or in combination of plural kinds thereof, or may be mixed with a carbon material such as carbon, etc.

In the non-aqueous electrolytic solution secondary battery using, as the positive electrode active material, the foregoing compound having an olivine type crystal structure, when it is charged at a high voltage of about 4.1 V or higher, the foregoing compound as the positive electrode active material melts aluminum as the positive electrode collector. When aluminum as the positive electrode collector is melted, the charge-discharge efficiency is lowered, or the charge and discharge cannot be achieved. Therefore, it is necessary that the charge is carried out at a charge voltage in the range of from a lower limit voltage of charge to a voltage at which the positive electrode collector is not melted. Here, though the lower limit voltage of charge varies within a minute range depending upon a variety of conditions such as a composition of the foregoing positive electrode active material, it can be made at about 3.5 V. Also, the voltage at which the positive electrode collector is not melted can be similarly made at about 4.1 V.

In the positive electrode active material layer 21B, a known resin material which is usually used as a binder of the positive electrode active material layer of a non-aqueous electrolytic solution secondary battery of this kind, for example, polyvinylidene fluoride PVdF can be further contained as a binder. Also, known additives such as a conductive agent can be added in the positive electrode active material layer 21B as the need arises.

<Negative Electrode>

For example, the negative electrode 22 has a structure in which a negative electrode active material layer 22B is provided on the both surfaces of a negative electrode collector 22A having a pair of opposing surfaces. While illustration is omitted, the negative electrode active material layer 22B may be provided on only one surface of the negative electrode collector 22A. The negative electrode collector 22A is configured of, for example, a metallic foil such as a copper foil.

The negative electrode active material layer 22B is configured to include one kind or plural kinds of a negative electrode material capable of doping and dedoping lithium as a negative electrode active material and is configured to include a binder likewise the positive electrode active material layer 21B as the need arises.

Examples of such a negative electrode active material include carbon materials, for example, hardly graphitized carbon, easily graphitized carbon, graphite, pyrolytic carbons, cokes, vitreous carbons, organic polymer compound burned materials, carbon fibers and active carbon. Of these, examples of the cokes include pitch coke, needle coke and petroleum coke. The organic polymer compound burned material as referred to herein is a material obtained through carbonization by burning a polymer material such as phenol resins and furan resins at an appropriate temperature, and a part thereof is classified into hardly graphitized carbon or easily graphitized carbon. Also, examples of the polymer material include polyacetylene and polypyrrole. Such a carbon material is preferable because a change in the crystal structure to be caused at the time of charge and discharge is very small, a high charge-discharge capacity can be obtained, and a good cycle characteristic can be obtained. In particular, graphite is preferable because its electrochemical equivalent is large, and a high energy density can be obtained. Also, hardly graphitized carbon is preferable because excellent characteristics are obtainable. Moreover, a material having a low charge-discharge potential, specifically one having a charge-discharge potential close to a lithium metal, is preferable because it is easy to realize a high energy density of the battery.

Also, materials containing, as a constitutional element, at least one member of a metal element and a semi-metal element capable of doping and dedoping lithium are exemplified as the negative electrode active material. This is because when such a material is used, a high energy density can be obtained. In particular, when such a material is used together with the carbon material, not only a high energy density can be obtained, but an excellent cycle characteristic can be obtained, and therefore, such is more preferable. This negative electrode material may be a single body, alloy or compound of a metal element or a semi-metal element, or may be a material having a phase of one kind or plural kinds of these substances in at least a part thereof. The alloy includes, in addition to one composed of two or more kinds of metal elements, one containing one or more kinds of metal elements and one or more kinds of semi-metal elements, and may contain a non-metal element. The organization of the alloy includes a solid solution, a eutectic crystal i.e. eutectic mixture, an intermetallic compound and a material in which two or more kinds thereof coexist.

Examples of the foregoing metal element or semi-metal element include magnesium, boron, aluminum, gallium, indium, silicon, germanium, tin, lead, bismuth, cadmium, silver, zinc, hafnium, zirconium, yttrium, palladium and platinum. These may be crystalline or amorphous.

Of the foregoing metal elements or semi-metal elements, those containing, as a constitutional element, a metal element or a semi-metal element belonging to the group 4B of the short form of the periodic table are preferable; and those containing, as a constitutional element, at least one of silicon and tin are especially preferable. This is because silicon and tin have large capability for occluding and releasing lithium and are able to obtain a high energy density.

<Separator>

The separator 23 is one which partitions the positive electrode 21 and the negative electrode 22 from each other and passes a lithium ion therethrough while preventing a short circuit of the current to be caused due to the contact of the both electrodes from occurring. It is preferable that this separator 23 is constituted of a porous membrane made of, for example, a synthetic resin or ceramic containing polyethylene and at least one member of polypropylene, polyvinylidene fluoride, polytetrafluoroethylene, $Al_2O_3$ and $SiO_2$. According to this, it is possible to suppress oxidative decomposition of the separator which comes into physical contact with the positive electrode at the time of continuous charge and to retard abrupt start-up of the current. The separator may be formed into a porous membrane upon mixing polyethylene and at least one member of polypropylene and polytetrafluoroethylene, and the surface of this porous membrane may be coated with $Al_2O_3$, polyvinylidene fluoride or $SiO_2$. Also, the foregoing porous membrane may be formed so as to have a laminated structure. A polyolefin-made porous membrane is preferable because it is excellent in an effect for preventing a short circuit from occurring and is able to devise to enhance the safety of the battery due to a shut down effect.

<Non-Aqueous Electrolytic Solution>

The non-aqueous electrolytic solution contains a non-aqueous solvent, an electrolyte salt dissolved in this solvent and a fluorinated ethylene carbonate FEC as an additive. The FEC is reductively decomposed at a nobler potential than water during the initial charge and reacts with water in the electrode during that. According to this, water in the interior of the battery is subsequently not reduced so that hydrogen fluoride or phosphoric acid which lowers the battery life is not formed. For that reason, by using, as a positive electrode active material, a compound having an olivine type crystal structure and represented by the general formula, $Li_xFe_{1-y}M_yPO_4$, even in the case where the amount of water to be contained in the battery is relatively large, when the FEC is contained in the electrolytic solution, hydrogen fluoride, phosphoric acid, etc. is not formed. That is, there is no problem that the life is lowered due to a lithium salt as in the case of using $LiPF_6$ for the electrolyte. In consequence, in the non-aqueous electrolytic solution secondary battery according to an embodiment, by containing an FEC as an additive to be contained in the non-aqueous electrolytic solution, it is possible to reduce a water content value of the electrode and to reduce and prevent the generation of hydrogen fluoride or phosphoric acid. Therefore, it is possible to reduce and prevent a lowering of the capacity of the positive electrode or negative electrode to be caused due to hydrogen fluoride or phosphoric acid.

Also, this effect does not vary even at a high temperature and can be obtained likewise the case at ordinary temperature. That is, the foregoing effect can be obtained even at a high temperature of 60° C. or higher at which $LiPF_6$ as the existing lithium salt becomes especially instable. In consequence, in an embodiment, it is possible to reduce and prevent deterioration of the capacity after high-temperature storage, and a non-aqueous electrolytic solution secondary battery having excellent high-temperature stability can be realized.

Examples of the FEC include 4-fluoro-1,3-dioxolan-2-one represented by the following formula (1), 4,4-difluoroethylene carbonate, 4,5-difluoroethylene carbonate, 4,4,5-trifluoroethylene carbonate and 4,4,5,5-tetrafluoroethylene carbonate. Of these, 4-fluoro-1,3-dioxolan-2-one is preferable from the standpoint of stability of the structure.

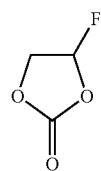

(1)

The content of the FEC in the non-aqueous electrolytic solution is preferably 0.5% by mass or more, and more preferably not more than 10% by mass, in relation to the non-aqueous electrolytic solution. When the content of the FEC in the non-aqueous electrolytic solution is 0.5% by mass or more, the cycle characteristic can be enhanced, and when the content of the FEC in the non-aqueous electrolytic solution is not more than 10% by mass, the same results are obtained, and therefore, such is preferable.

As the non-aqueous solvent, a cyclic carbonic acid ester such as ethylene carbonate and propylene carbonate can be used. It is preferable to use either one of ethylene carbonate or propylene carbonate; and it is especially preferable to use a mixture of these carbonates. This is because the cycle characteristic can be enhanced.

Also, in addition to these cyclic carbonic acid esters, it is preferable to use a mixture of such a cyclic carbonic acid ester with a chain carbonic acid ester such as diethyl carbonate, dimethyl carbonate, ethylmethyl carbonate and methylpropyl carbonate as the non-aqueous solvent. This is because high ionic conductivity can be obtained.

Furthermore, it is preferable that 2,4-difluoroanisole or vinylene carbonate is contained as the non-aqueous solvent. This is because 2,4-difluoroanisole is able to enhance the discharge capacity, and vinylene carbonate is able to enhance the cycle characteristic. Accordingly, by using a mixture of these materials, the discharge capacity and cycle characteristic can be enhanced, and therefore, such is preferable.

Examples of non-aqueous solvents other than those exemplified above include butylene carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, acetonitrile, glurtaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethyl sulfoxide and trimethyl phosphate.

Examples of the electrolyte salt include lithium salts, and the lithium salts may be used singly or in admixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalatoborate and LiBr. Of these, LiPF6 is preferable because it is able to obtain high ionic conductivity and to enhance the cycle characteristic.

<Manufacturing Method>

The secondary battery according to an embodiment can be manufactured in the following manner.

First of all, the positive electrode can be manufactured in the following manner. For example, the foregoing positive electrode active material is mixed with a conductive agent and a binder to prepare a positive electrode mixture, and this positive electrode mixture is dispersed in a solvent such as N-methyl-2-pyrrolidone to prepare a positive electrode mixture slurry in a paste state. Subsequently, this positive electrode mixture slurry is coated on the positive electrode collector 21A, and after drying the solvent, compression molding is carried out by using a roll press, etc. to form the positive electrode active material layer 21B. There is thus prepared the positive electrode 21.

Also, the negative electrode can be manufactured in the following method. For example, the foregoing negative electrode active material is mixed with a binder to prepare a negative electrode mixture, and this negative electrode mixture is dispersed in a solvent such as N-methyl-2-pyrrolidone to form a negative electrode mixture slurry in a paste state. Subsequently, this negative electrode mixture slurry is coated on the negative electrode collector 22A, and after drying the solvent, compression molding is carried out by using a roll press, etc. to form the negative electrode active material layer 22B. There is thus prepared the negative electrode 22.

Subsequently, not only the positive electrode lead 25 is installed in the positive electrode collector 21A by welding or the like, but the negative electrode lead 26 is installed in the negative electrode collector 22A by welding or the like. Thereafter, the positive electrode 21 and the negative electrode 22 are wound via the separator 23; a tip part of the positive electrode lead 25 is welded on the safety valve mechanism 15; a tip part of the negative electrode lead 26 is welded on the battery can 11; and the wound positive electrode 21 and negative electrode 22 are interposed between a pair of the insulating plates 12 and 13 and contained in the interior of the battery can 11. After containing the positive electrode 21 and the negative electrode 22 in the interior of the battery can 11, an electrolytic solution is injected in the interior of the battery can 11, thereby impregnating the separator 23 therewith. Thereafter, the battery lid 14, the safety valve mechanism 15 and the positive temperature coefficient element 16 are caulked via the gasket 17 in the opened end of the battery can 11 and fixed. There is thus formed the secondary battery as illustrated in FIG. 1.

In this secondary battery, when charge is carried out, for example, a lithium ion is released from the positive electrode active material layer 21B and occluded in the negative electrode active material layer 22B via the electrolytic solution. Also, when discharge is carried out, for example, a lithium ion is released from the negative electrode active material layer 22B and occluded in the positive electrode active material layer 21B via the electrolytic solution.

While the present application has been described with reference to the foregoing embodiments, it should not be construed that the present application is limited to the foregoing embodiments, and various changes and modifications can be made therein. For example, in the foregoing embodiments, while the secondary battery having a wound structure has been described, the present application can be similarly applied to secondary batteries having a structure in which a positive electrode and a negative electrode are folded or a structure in which a positive electrode and a negative electrode are superimposed. In addition thereto, the present application can also be applied to secondary batteries of a so-called coin type, button type, square shape type or laminate film type or the like.

Also, in the foregoing embodiments, while the case of using an electrolytic solution has been described, the present application can also be applied to the case of using other electrolyte. Examples of other electrolyte include an electrolyte in a so-called gel state in which an electrolytic solution is held by a polymer compound.

EXAMPLES

The present application is specifically described below with reference to the following Examples and Comparative Example, but it should not be construed that the present application is limited thereto.

Example 1

90 parts by weight of $LiFePO_4$ having an olivine type crystal structure as a positive electrode active material, 5 parts by weight of polyvinylidene fluoride as a binder and 5 parts by weight of graphite as a conductive agent were mixed to prepare a positive electrode mixture. This positive electrode mixture was dispersed in N-methyl-2-pyrrodilidone as a solvent to form it in a slurry state. This positive electrode mixture slurry was coated on the both surfaces of a strip-shaped aluminum foil having a thickness of 15 μm to be used as a positive electrode collector, dried and then subjected to compression molding by a roll press, thereby obtaining a strip-shaped positive electrode.

90 parts by weight of graphite as a negative electrode active material and 10 parts by weight of polyvinylidene fluoride PVdF as a binder were mixed to prepare a negative electrode mixture. This negative electrode mixture was dispersed in N-methyl-2-pyrrodilidone as a solvent to form it in a slurry state. This negative electrode mixture slurry was coated on the both surfaces of a strip-shaped copper foil having a thickness of 12 μm to be used as a negative electrode collector, dried and then subjected to compression molding by a roll press, thereby obtaining a strip-shaped negative electrode.

Also, 1 M of $LiPF_6$ as an electrolyte and 0.5% by mass of FEC, specifically, 4-fluoro-1,3-dioxolan-2-one, were dissolved in a mixed solution of ethylene carbonate and dimethyl carbonate in a volume mixing ratio of 1/2, thereby preparing a non-aqueous electrolytic solution.

The positive electrode and the negative electrode were wound across a polyethylene-made microporous film and charged in a metal case having a diameter of 18 mm and a height of 65 mm together with the non-aqueous electrolytic solution, thereby preparing a cylindrical battery.

Example 2

A cylindrical battery was prepared in the same manner as in Example 1, except for changing the addition amount of the FEC to 0.1% by mass.

Example 3

A cylindrical battery was prepared in the same manner as in Example 1, except for changing the addition amount of the FEC to 10% by mass.

Example 4

A cylindrical battery was prepared in the same manner as in Example 1, except for changing the addition amount of the FEC to 30% by mass.

Example 5

A cylindrical battery was prepared in the same manner as in Example 1, except for using $LiFe_{0.7}Mn_{0.3}PO_4$ having an olivine type crystal structure as the active material active substance.

Comparative Example 1

A cylindrical battery was prepared in the same manner as in Example 1, except for not using the FEC.

<Evaluation>

With respect to each of the obtained batteries, after charging of 3.6 V, 0.1 CA, 0.1 A and Cut, discharge was carried out at 1 CA to a final voltage of 2.0 V; a discharge capacity retention ratio was measured while defining this as one cycle; and a cycle life test was carried out. The results are shown in Table 1.

Also, the water content value of the positive electrode before assembling and the water content value of the positive electrode after 100 cycles were measured by the Karl Fischer's method. The results are shown in Table 1.

Figure 3:
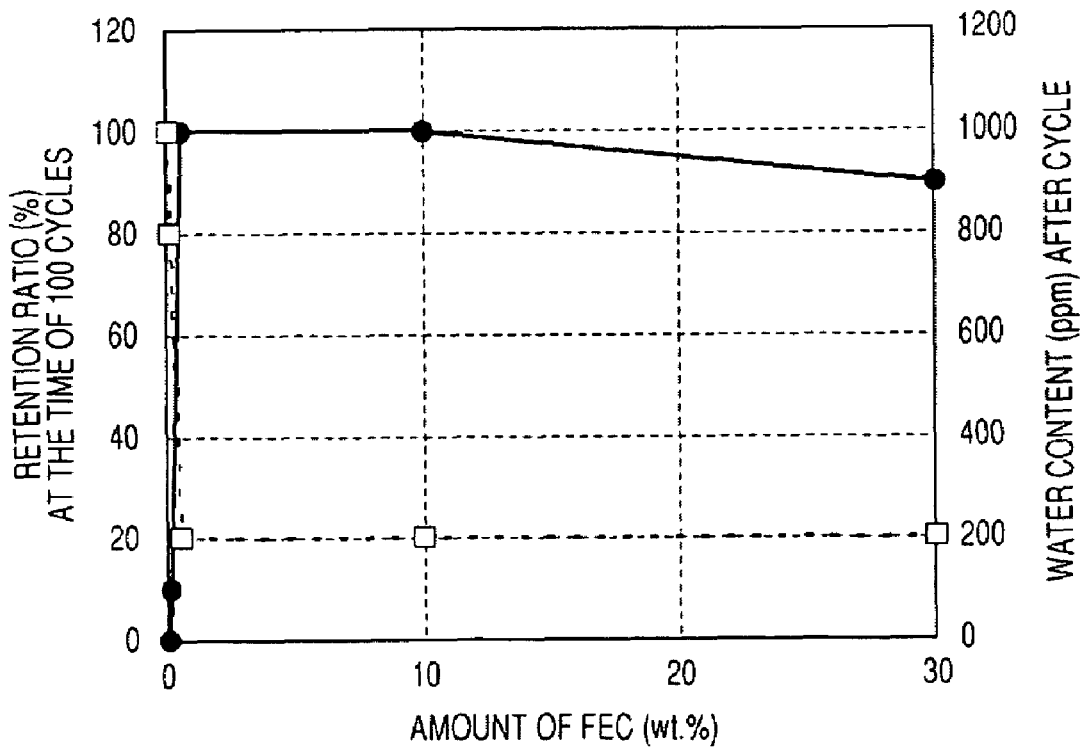
FIG. 3 is a graph showing the relationship between the addition amount of an FEC and a cycle retention ratio and a water content value of an electrode after cycle.

Furthermore, from the results of Examples 1 to 4 and Comparative Example 1, the addition amount of the FEC, the cycle retention ratio and the water content value of the electrode after cycle were plotted and shown in FIG. 3.

TABLE 1

| | Type of positive electrode active material | Amount of FEC (% by mass) | Discharge capacity retention ratio at the time of 100 cycles (%) | Water content value of electrode before cycle (mass ppm) | Water content value after cycle (mass ppm) | FEC/LiPF$_6$ mass ratio |
|---|---|---|---|---|---|---|
| Example 1 | LiFePO$_4$ | 0.5 | 100 | 1000 | 200 | 0.05 |
| Example 2 | LiFePO$_4$ | 0.1 | 10 | 1000 | 800 | 0.01 |
| Example 3 | LiFePO$_4$ | 10 | 100 | 1000 | 200 | 1 |
| Example 4 | LiFePO$_4$ | 30 | 90 | 1000 | 200 | 3 |
| Example 5 | LiFe$_{0.7}$Mn$_{0.3}$PO$_4$ | 0.5 | 100 | 1000 | 200 | 0.05 |
| Comparative Example 1 | LiFePO$_4$ | 0 | 0 | 1000 | 1000 | 0 |

As is clear from the foregoing Table 1 and FIG. 3, in Examples 1 to 4 containing the FEC, the water content value of the electrode after cycle was lowered. In particular, it was noted that Examples 1, 3 and 4 in which the addition amount of the FEC was 0.5% by mass or more had excellent life performance such that the retention ratio was substantially 100%. On the other hand, in Comparative Example 1 not containing the FEC, the water content value of the electrode did not vary before and after cycle, and the life was very short such that the retention ratio was 0%. Also, the higher the addition amount of the FEC, the lower the water content value of the electrode after cycle was; and the lower the addition amount of the FEC, the better the cycle life was.

Also, from the results of Example 5, it was noted that even by using LiFe$_{0.7}$Mn$_{0.3}$PO$_4$ having an olivine type crystal structure as the positive electrode active material, the same results were obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolytic solution secondary battery comprising:
   a positive electrode containing a positive electrode active material, the positive electrode active material consisting essentially of a compound represented by a following general formula:

Li$_x$Fe$_{1-y}$M$_y$PO$_4$ wherein M is at least one member selected from the group consisting of Co, Ni, Cu, Zn, Al, Sn, B, Ga, Cr, V, Ti, Mg, Ca and Sr; 0.9<x<1.2; and 0<y<0.3;
   a negative electrode containing a lithium metal, a lithium alloy or a material capable of doping and dedoping lithium; and
   a non-aqueous electrolytic solution,
   the non-aqueous electrolytic solution containing a fluorinated ethylene carbonate FEC, wherein the content of the FEC in the non-aqueous electrolytic solution ranges from 0.5% to 10% by mass in relation to the non-aqueous electrolytic solution, wherein the non-aqueous electrolytic solution further contains LiPF$_6$.

2. A non-aqueous electrolytic solution secondary battery comprising:
   a positive electrode containing a positive electrode active material, the positive electrode active material consisting essentially of a compound represented by a following general formula:

Li$_x$Fe$_{1-y}$M$_y$PO$_4$ wherein M is at least one member selected from the group consisting of Co, Ni, Cu, Zn, Al, Sn, B, Ga, Cr, V, Ti, Mg, Ca and Sr; 0.9<x<1.2; and 0≦y<0.3;
   a negative electrode containing a lithium metal, a lithium alloy or a material capable of doping and dedoping lithium; and
   a non-aqueous electrolytic solution,
   the non-aqueous electrolytic solution containing a fluorinated ethylene carbonate FEC selected from the group consisting of 4,4-difluoroethylene carbonate, 4,5-difluoroethylene carbonate, 4,4,5-trifluoroethylene carbonate and 4,4,5,5-tetrafluoroethylene carbonate, wherein the content of the FEC in the non-aqueous electrolytic solution ranges from 0.5% to 10% by mass in relation to the non-aqueous electrolytic solution, wherein the non-aqueous electrolytic solution further contains LiPF$_6$.

3. The non-aqueous electrolytic solution secondary battery according to claim 2, wherein the compound represented by the general formula, Li$_x$Fe$_{1-y}$M$_y$PO$_4$ is LiFePO$_4$.

* * * * *